Dec. 17, 1929.　　　E. H. ARNOLD　　　1,739,495
METAL WHEEL MANUFACTURE
Original Filed June 22, 1925　　2 Sheets-Sheet 1

INVENTOR
Ernest H. Arnold
BY Frank D. Gray
ATTORNEY

Dec. 17, 1929.    E. H. ARNOLD    1,739,495
METAL WHEEL MANUFACTURE
Original Filed June 22, 1925    2 Sheets-Sheet 2
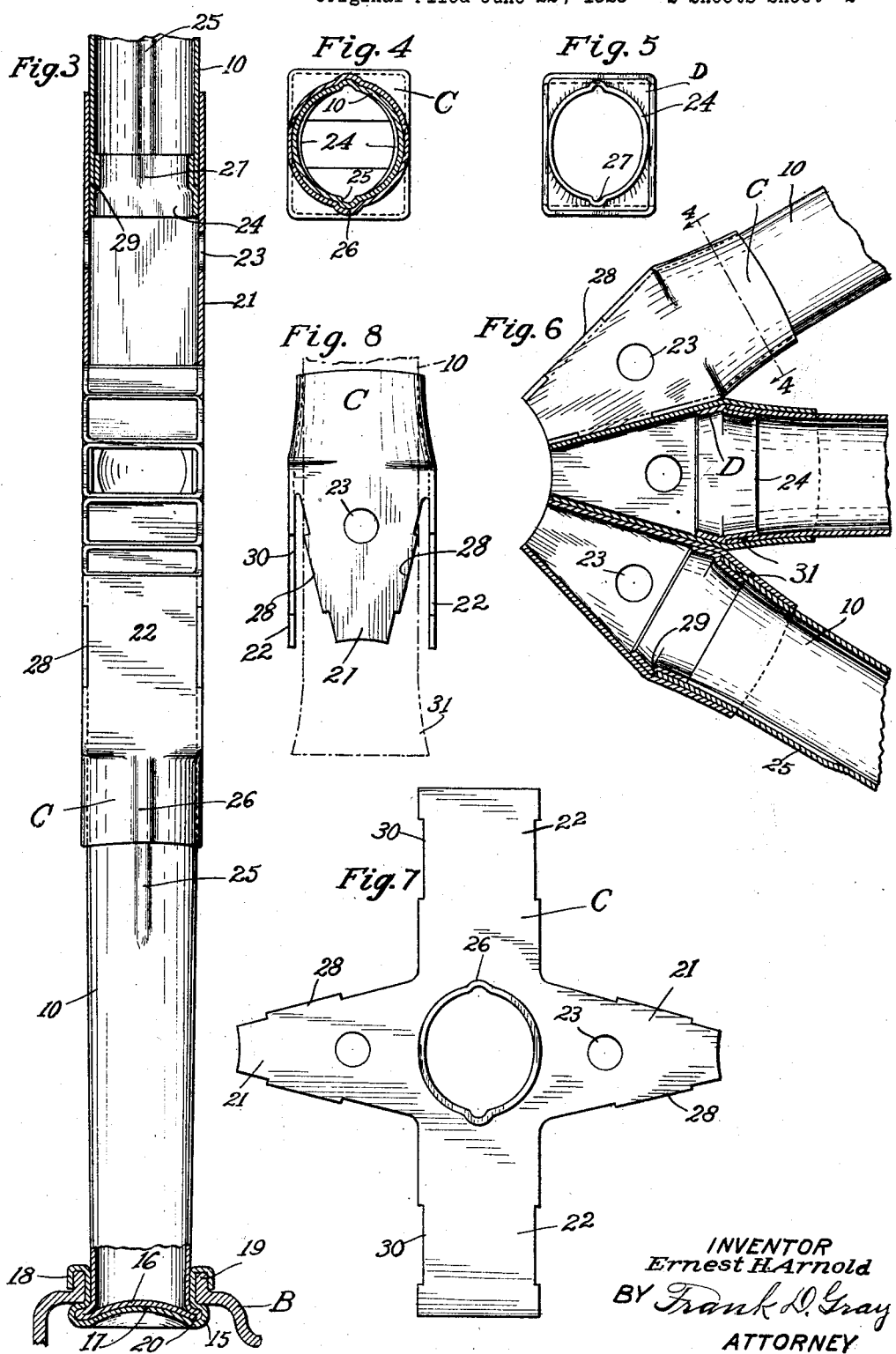

Patented Dec. 17, 1929

1,739,495

UNITED STATES PATENT OFFICE

ERNEST H. ARNOLD, OF CLEVELAND, OHIO

METAL-WHEEL MANUFACTURE

Application filed June 22, 1925, Serial No. 38,714. Renewed May 9, 1929.

This invention relates to improvements in metal wheel manufacture and especially to the manufacture of metal wheels in which the hollow spokes are drawn from plate material by die pressure from the rim end of the spokes toward the hub or axle end thereof. It is an object of my present invention to draw a sheet metal spoke to the length desired, leaving the outer end of the spoke closed and expanding the inner end in the direction of the plane of the wheel, and join the inner ends to the hub parts by separate junction members having their hub ends rectangular in cross-section, which latter are bolted to the hub parts as the usual spokes are.

It is a further object of my invention to insert the outer or closed ends of the spokes into apertures of the rim, first providing locking caps for said apertures and inserting the spoke ends into the capped apertures of the rim, and thereafter locking the spokes and caps together, and both in the rim apertures.

A still further object of my improved structures lies in the provision of hub members for receiving therein the base ends of the spokes, the inner ends of these members comprising originally separated strips which are bent inward into adjacent position at their edges, after the spokes have been radially inserted therein, and forced outward through the openings in the members and thence projected into the capped apertures.

It is a further object to provide a series of hub members for holding the hub ends of the spokes in proper relative arrangement without the provision of annular plates or discs other than the usual form of axle-receiving member which may be attached to the separate hub members after the wheel structure has been assembled. These members are provided in the same number as the spokes and my improved method of arrangement of the parts in a common relationship, enables the parts to be manufactured by drawing operations, thus reducing the expense of manufacture, as well as results in a stronger binding result in the finished wheel.

With these and other objects in view, as they will appear as the description proceeds, my invention comprises certain novel features of construction and certain novel steps of my improved method of manufacturing a metal wheel, all of which are described in the specification, illustrated in the accompanying drawings and recited in the appended claims.

In the drawings,

Figure 3 is a cross section taken on a plane indicated by the line 3—3 of Fig. 1;

Figure 4 is a cross section taken on the line 4—4 of Fig. 6;

Figure 5 is a plan view of one of the hub members before being bent into complete form;

Figure 6 is a side view of the hub portions of three spokes and their hub members assembled in adjacent position as they would appear in the wheel hub, one of the parts being shown in elevation, and the others in longitudinal section;

Figure 7 is a plan of the blank from which a hub member is formed, and

Figure 8 is a side elevation of a hub member after the flaps are partially bent in, but not yet closed together.

Figure 1:
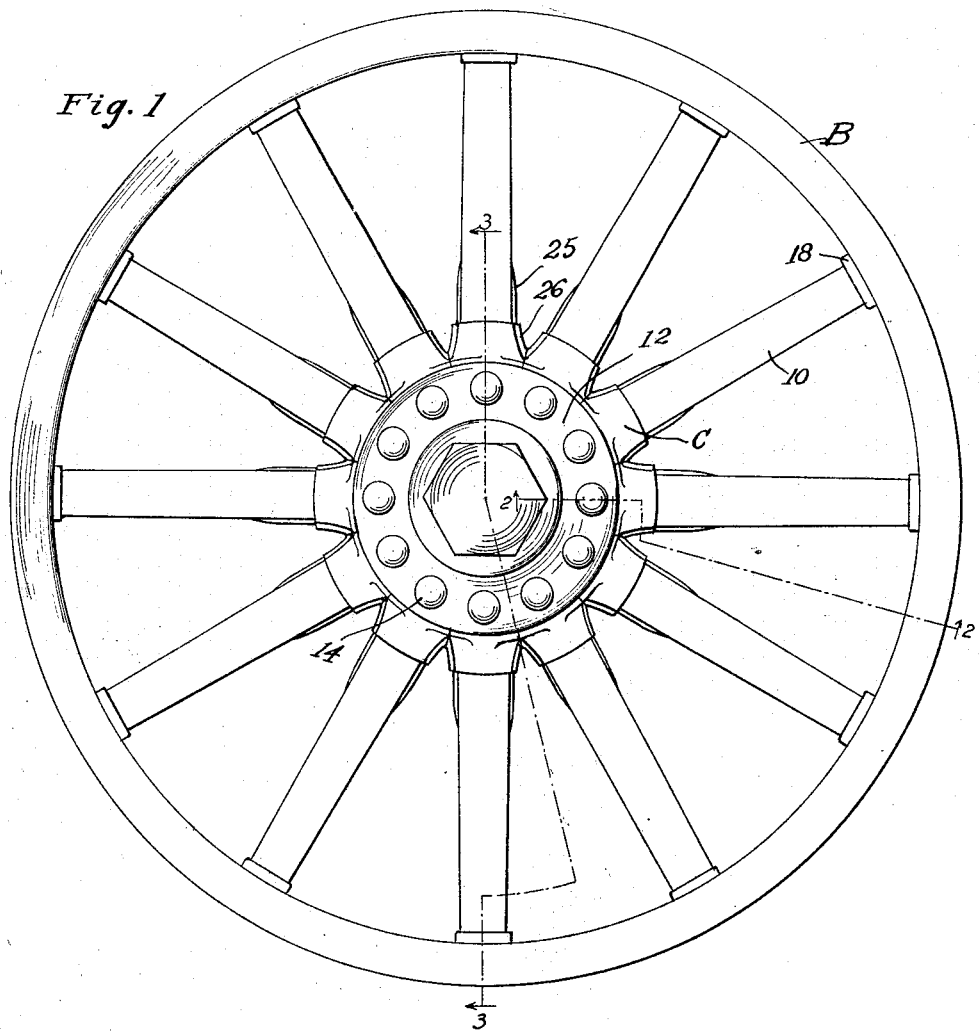
Figure 1 is a side elevation of a finished wheel embodying my invention.

The metal wheel disclosed in this application is not especially concerned with the manner of mounting the same upon the axle, though I have illustrated for convenience in explanation, a well-known form of axle-receiving member A comprising a reduced cylindrical part 11 with an integral flange part 12, and a separate annular part 13 designed to be mounted in position parallel with the flange 12. These parallel parts are bound together by cross bolts 14 when the wheel is assembled.

The wheel comprises further a usual rim part B, a plurality of elongated junction members C somewhat irregular in shape and an equal number of elongated tubular members D for reinforcing purposes. The said junction parts are connected with the rim by hollow spokes 10 having closed ends 16, open ends 31, but not extending to the hub itself, the said open ends being expanded somewhat in the plane of the wheel, as shown in Figs. 6 and 8. These spokes are drawn from a blank by successive steps, gradually elongating the material and reducing its cross section so that a closed tube is formed having an oval-shaped opening at the hub end, and the closed end especially adapted for insertion in the capped apertures of the rim. These apertures are provided with inwardly flanged edges 19, and the caps 15 have outwardly flanged edges 18 engaging the flanges 19. After inserting the spokes in the caps, the center of cap at 17 and the spoke at 16 are at one operation pressed inwardly, at the same time expanding both materials at 20 so as to lock the parts against withdrawal inwardly from the rim. Such position is shown in Fig. 3. The parts 18 and 19 will prevent outward extension of the spokes.

In Fig. 7 is shown the blank C after the tubular end has been drawn to the form shown in Fig. 8, but with the opposite strips 22 extending in almost exact alinement and shaped substantially rectangular in outline. At right angles to these strips are alined strips 21 substantially frusto-conical in outline but having apertures 23 therein for a purpose to be explained later. As many of these parts C are provided as there are spokes, the hub end of each spoke being seated in the tubular end of a corresponding part C. Since the tubular part of C is reduced in cross section at a point nearest the rim, the spokes 10 having enlarged hub ends 31 must be inserted into the tubular part from the axle side of the same in the manner indicated in dotted lines in Fig. 8. The expanded end of the spokes will finally be positioned in the said tubular parts as shown in Fig. 6 of the drawing. By my method of assembly the spokes are all threaded through the junction members from the axle end thereof, though of course, this is done before the hub parts A are mounted in position.

The tubular members D are formed by drawing from metal at the same time shaping the outermost ends somewhat frusto-conical at 24, as shown in Figs. 3 and 6, though it is to be noted that the outer end of the tube in its final shape is rather oval in outline, having its larger dimension in the plane of the wheel, as shown in Figs. 5 and 6. The base of this tube part 24 is inset slightly to provide an external shoulder at 29 on which the inner edge of the spoke 10 may seat, as shown clearly in Figs. 3 and 6. The innermost end of the members D is shaped by drawing into frusto-pyramidal form, as made clear in Figs. 5 and 6. These terms to described the outline of the parts provided for securing the spokes and hub members together, are made use of to make approximate at least the form used in my structure, though it is to be understood that these parts C and D are somewhat irregular, and the terms chosen are not absolutely accurate as applied to them.

As an additional means of strengthening the spoke and hub members, the inner expanded ends of the spokes are provided with spaced longitudinal beads 25 which are fitted into corresponding longitudinal beads 26 in the outer ends of the hub members C, as shown in Figs. 3, 4 and 6, the beads being positioned in the plane of rotation of the wheel. This provision therefore greatly resists the strain on the spokes tending to cause them to buckle longitudinally.

The sleeves D are also provided with spaced longitudinal beads 27 at their outermost ends to fit the beads 25 of the spokes, though the beads 27 do not appear in Fig. 4 of the drawings, since this view is taken in a plane above the edge of such member. The strips 21 of the members C are provided with edge lips 28 extending beyond the normal edges of the strips. The strips 22 are provided with corresponding narrow notches 30 designed to receive the lips 28 when the several strips are bent toward each other in pairs to form a wedge-shaped hollow boxing of the form of the usual hub end of a metal spoke, when the edges may readily be welded together as desired.

In building my wheel by this novel method, an apertured rim is first provided, after which caps having outwardly bent peripheral flanges as shown at 18 are inserted radially through the apertures while the part 17 of the caps is extending outwardly in the line of the wheel radius and before the point 15 has been expanded beyond the periphery of the aperture. The flanges 18 are then bent to the position shown in Fig. 3, thus securing the caps against outward movement through the apertures. The capped rim is now ready to receive the spokes in the caps.

The hub ends of the spokes do not extend inward radially into contact with each other nor with the axle. The hub ends of adjacent spokes are, when the wheel is assembled, spaced from the hub and separated from each other by two thicknesses of metal, the latter being that of the walls of the hub members C, as clearly shown in Fig. 6. The spokes are threaded through the members C radially outward finally extending through the frusto-conical part of said members, until finally the spoke ends become seated in the said frusto-conical parts. The members D are then inserted into the inner ends of the junction members C until the shoulders 29 of the said members D positively engage the inner ends 31 of the spokes.

The inner end strips 21 and 22 of the members C are bent in until the parts 28 of strips 21 engage the parts 30 of strips 22, when the tapering box-shaped hollow inner ends of the members C have the shape usually given the hub ends of the hollow spokes themselves. The meeting edges of the parts C are therefore efficient in strengthening these parts, while the spokes 10 are themselves braced, both by the beads 25 and 26, and by the tubular members C and D below the inner ends of the spokes. By the arrangement of these parts in successively completing the several elements of the wheel in the order stated and illustrated, great ease of manufacture of the individual parts results, as well as simplicity of assemblage is afforded, thus reducing the expense of building the finished product.

By providing the junction members C in the blank form shown in Fig. 7, the spokes 10 are readily inserted through the tubular end of C, even though the lower or hub ends of the spokes 10 are expanded so far in cross section that insertion of the latter would be impossible after the strips 21 and 22 had been closed up in the final form shown in Fig. 6. The preferred manner of assembling these parts is to first insert the spokes in the frusto-conical parts of C before bending in the strips, then inserting the members D in said parts below the spoke ends, and finally force the members D into position where the ends 31 of the spokes will rest on the shoulders outside the tube parts 24, while the frusto-pyramidal end of D will fit nicely against the surfaces of the strips 21 and 22 when the latter are closed in.

Figure 2:
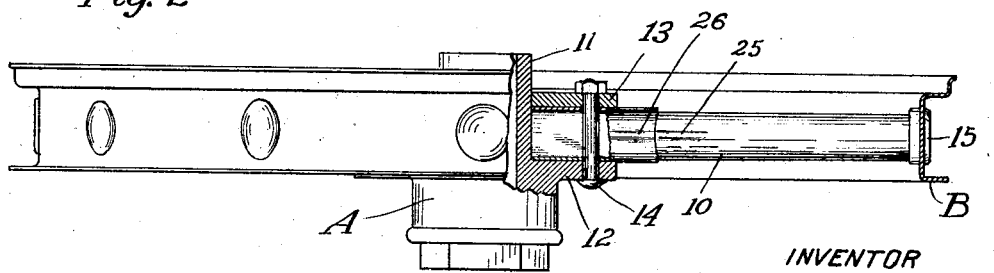
Figure 2 is an edge view of a wheel, a portion being shown in cross section on the line 2—2 of Fig. 1.

The parts C and D are readily assembled by forcing the spokes and such parts radially outward into relative position as above indicated with the outer ends of the spokes inserted in the caps and there secured as above explained. Such order of assemblage is found to be very simple and highly practical, especially for the positioning of all but the last few sets of hub parts and spokes, after which it is found most practicable to insert the last few spokes and their associated parts C and D while the extreme inner ends are held slightly out of the plane of the wheel until the outer ends of these last spokes are inserted in their corresponding caps in the rim aperture, when the hub ends of these last parts C may be readily forced transversely into their proper position thus completing the wheel assemblage with the exception of the mounting the same upon the axle member A. Almost any of the standard types of such axle members may be used, and the particular character thereof does not concern this invention. The essential features of the combinations of the said member A, including the parts 11, 12 and 13, or their equivalents, comprise the insertion of the part 11 into the central opening at the hub ends of the parts C, the mounting of the annular part 13 upon the opposite end of the cylinder 11, and the bolting of the parts 12, C and 13 securely together by insertion of the bolts through the holes 23 in the strips 21 and through the flanges 12 and annulus 13, as shown clearly in Fig. 2.

The three parts 10, C and D are seamless and are made by drawing from sheet metal, the initial operation in making each part being drawing from a flat blank to produce a dished or cup-shaped article which is now subjected to successive operations of drawing varying in kind to finally produce the several parts above-named. The dished article is subjected to continuous elongating steps which also reduce the cross-sectional area simultaneously until the closed-end spoke 10 results having inner ends 31 slightly expanded as illustrated. The parts C and D are on the contrary, drawn from the initial cup shape to a somewhat elongated tubular form with a peripheral flat flange about the larger end of the tube. The next step in forming the part D is shaping, also by drawing, the pyramidal end shown in Figs. 5 and 6, the closed end 24 being removed to result in an open tubular end with the external shoulder 29 thereabout. The encircling flat flange of the blank finally resulting in the part C, is stamped at the corners, as shown in Fig. 7, at the same time that the closed end of the tube is removed to form the opening shown in Figs. 6, 7 and 8. The strips are then bent in as explained in a former page.

The final assemblage of the parts resulting in the wheel consists in, first, providing the capped rim by inserting the caps in the apertures of the rim and securing the flange 18 about 19 as shown in Fig. 3, the caps not having yet been pressed in at 17 to lock them or to expand them at 15. Second, parts C are provided in the form shown in Fig. 8. An operative now inserts the closed end 16 of a spoke into a member C and draws the latter down from the relative position shown in dotted lines in Fig. 8 to that shown in Fig. 6. A member D is now inserted in the lower end of C and crowded upward until the shoulder 29 strikes the lower end 31 of the stroke 10, after which the strips 21 and 22 are bent inward their edges welded together into the form made clear in Figs. 3 and 6. The outer ends of the spokes and caps are then pressed inward thereby expanding the outer edges of the two metal layers at 15 and 20, as shown in Fig. 3, locking the spokes against longitudinal movement in either direction relative to the rim. There is now produced a metal wheel complete except that the axle member A has not been inserted in the opening between the inner ends of the parts C. This method of building my wheel permits the use of spokes relatively shorter than would otherwise be essential for securing them to the hub members, and yet the inner ends 31 of the spokes are secured between two metal layers external and internal thereof, which feature together with the shoulder supports for the ends of the spokes and the beaded reinforcement of the same, very strongly braces the entire wheel structure, even more positively than when the long spoke structure of the customary wheel is used. It is also to be noted that the reduced lower end of the pyramidal boxing of the member C securely holds the member D in its upper position, since the lower ends of the member D cannot descend into a portion of the member C that has a smaller cross section.

My method of wheel building is therefore the novel one of constructing the same from the center outward rather than the more usual one of starting the operation from the rim and locating the hub ends of the spokes as occasion demands, this feature broadly being like that of the method disclosed in my application for patent filed May 5, 1925, Ser. No. 28,100, though they are essentially different from each other in that the present case involves no separate hub discs as in the earlier-filed application.

Since I have thus clearly and materially invented novel and improved structure for the seamless-spoke wheel and the strong reinforced hub structure using such spokes, I desire to claim broadly such novel parts here disclosed as well as the combination of the structures shown, and the method of forming the final product and parts in the manner described.

What I claim and desire to secure by Letters Patent is—

1. A metal vehicle wheel comprising, tubular spokes having expanded inner ends, an axle-receiving member having spaced flange and annular disk, and elongated junction members, each having a seamless tubular portion oval in cross-section tapering outwardly to receive said expanded spoke end therein and a hollow wedge-shaped portion rectangular in cross-section and tapering inwardly in the plane of the wheel, the said wedge-shaped portions being bolted in adjacent relation between and to the flange and disk.

2. A metal wheel comprising an apertured rim, a hub, a series of radially-arranged spoke supporting members having their outer ends oval in cross-section and tapering outwardly and their inner ends rectangular in cross-section and tapering inwardly in the plane of the wheel and of uniform width transversely, hollow spokes secured in the rim apertures, the inner ends of the spokes being expanded to correspond with the oval end of the said members and being secured in said oval end, and means for locking the tapering inner ends of the said support members in the hub.

3. In a wheel, the combination with an axle-receiving member having a cylinder, a peripheral flange and an annular disk parallel thereto, of elongated junction members having hollow box-like ends of uniform width transverse of the wheel and tapering inwardly circumferentially seated on said cylinder with their inclined surfaces contiguous and having seamless outer ends tapering outwardly oval in cross-section, and tubular spokes having their inner ends seated in said oval ends of the members and of corresponding form thereto and bolts passing through the flange, disk and said inner ends of the junction members to secure the latter between the flange and disk.

4. In a wheel, the combination of an apertured rim, a hub, a series of radially-arranged, elongated tubular junction members having reduced oval ends and their opposite inner ends reduced into wedge-shaped contour, tubular reinforcing members of general form similar in cross-section to the junction members in which they fit, but shortened in length, and the oval ends being offset inwardly to form external shoulders and providing a peripheral cavity between the two members, and hollow spokes having their outer ends secured in the rim apertures and their inner ends expanded in the plane of the wheel and secured in said cavity and with their inner ends resting on said shoulders, and means for securing the inner ends of the junction members in the hub.

5. In a wheel, the combination of a hollow metal spoke having its inner end expanded in the plane of the wheel to provide an oval form in cross-section with longitudinal reinforcing beads at the ends of the oval, a tubular junction member having reduced oval and wedge-shaped ends, respectively, and a tubular reinforcing member of suitable size and shape to fit within the junction member, but having its oval end offset from the main structure to provide an external shoulder and a cavity between the two members, when they are in telescopic relation, to receive the expanded end of the spoke therein with the inner edge of the latter resting on the shoulder, the oval ends of both said members having longitudinal beads to fit the beads of the spokes, there being transverse apertures in the lateral walls of the junction members for passing hub bolts therethrough.

6. In a wheel, the combination with an axle structure comprising a cylinder, a peripheral flange and a spaced annular disk parallel thereto, of spoke-supporting members comprising hollow, elongated junction members having their inner end rectangular in cross-section and their outer ends oval in cross section with an enlarged cross-sectional area intermediate their ends, and reinforcing members having the general contour of the inner surface of the supporting members but relatively shorter than the latter, the oval ends of the reinforcing members being somewhat inset from the body thereof thereby forming external shoulders thereon and providing a curved cavity between the walls of the two members outwardly from said shoulder, and hollow spokes having their inner ends seated in said cavities and of corresponding form thereto, with their inner edges resting on said shoulder, and bolts passing through the supporting members, the flange and the disk.

7. The method of manufacturing a junction member for securing the inner ends of wheel spokes to the hub comprising, drawing a tubular member from a flat metal blank by a series of drawing operations until there results a tubular member having a closed end and an open end having a peripheral flange, notching radially said peripheral flange at four equally-spaced points, whereby there results two opposite integral flaps rectangular in outline, and two intermediate flaps tapering in outline, bending inwardly toward each other the flaps of each pair until their adjacent edges meet, welding the contiguous edges together, and removing the closed end of the tubular portion.

8. The method of manufacturing metal vehicle wheels comprising, mounting in radial relation hollow, metal spokes having expanded inner ends with the latter spaced from the hub and members and from each other, by securing each spoke within a hollow, supporting member having a small and a larger end, by inserting the spoke into the larger end and passing it through the member until the expanded end of the spoke reaches the smaller portion of the member where the latter is too small to permit release therefrom, reducing the larger end of the supporting member to prevent the withdrawal of the spoke therefrom, and securing the outer ends of the spokes to a wheel rim, mounting the reduced ends of said members in contiguous relation about the axis of the wheel and bolting together the axle member and said supporting members.

9. The method of manufacturing metal, vehicle wheels comprising, threading each of a series of hollow spokes having inner ends expanded in the plane of the wheel and oval in cross-section, through a hollow, elongated spoke supporting structure having its smaller end correspondingly oval in cross-section and the larger end having integral extended flaps separated at their ends, securing the outer ends of the spokes in an apertured rim, inserting within the flap end of the said structure, tubular pieces having oval ends fitting neatly within the oval ends of the spokes and having tapered opposite ends rectangular in cross-section, bending said flaps toward each other about the tapered ends of the said pieces and securing their contacting edges together to form a hollow body tapering inwardly in the plane of the wheel, but of uniform width transverse of the wheel, mounting said bodies radially about the axis of the wheel, and bolting together the axle member and said hollow bodies.

10. The method of mounting a series of hollow metal spokes in a wheel having an apertured rim comprising, mounting the inner ends of the spokes in spaced relation to the hub, and from each other, by providing hollow supporting members having a rectangular cross section at one end with integral flaps extending therefrom in separated relation, and having a reduced opposite end oval in cross section with an opening of sufficient size to hold therein the inner ends of the spokes, threading the spokes through said members radially outward until their inner ends can be forced no farther, bending the flaps inwardly toward each other until their adjacent edges meet, securing said edges together to form hollow bodies having a lateral width uniform with the diameter of the spokes and tapering inwardly in the plane of the wheel, securing the outer spoke ends in the rim apertures, mounting the tapering ends about the axle member of the wheel and bolting together the axle member and said bodies.

11. The method of manufacturing metal vehicle wheels comprising, threading each of a series of hollow spokes having their inner ends expanded and oval in cross section, through a hollow, elongated spoke-supporting structure having a smaller end correspondingly oval in cross section, and of a size to receive the inner end of the spoke, and a larger end having integral flaps extended in pairs separated at their ends, securing the outer ends of the spokes in a wheel rim, bending inward beneath the expanded ends of the spokes, the said flaps of each pair toward each other until their adjacent edges meet, and securing their edges together to form hollow bodies, rectangular in cross section having uniform lateral width and tapering inwardly in the plane of the wheel, mounting said tapering ends in contiguous relation at the hub ends of the spokes about the axis of the wheel leaving the usual axial opening for receiving therein an axle-receiving member, and bolting together the axle member and said bodies.

12. The method of making metal vehicle wheels comprising, mounting in radial relation hollow metal spokes having inner ends expanded in the plane of the wheel with said inner ends spaced from the hub structure and from each other, by securing each spoke within a hollow supporting member having a small and a larger end, by inserting the spoke into the larger end and passing it through the member until the expanded end of the spoke reaches the smaller end of the member where the bore is too small to permit said expanded end to emerge therefrom, inserting within the said larger end of each of the members a hollow reinforcing member having the general form of the inner surface of the supporting member but relatively shorter, the outer ends of the reinforcing members being slightly inset from the main portion thereby forming an external shoulder thereon and providing a tapered cavity between the walls of the two members outwardly from said shoulder, reducing the larger ends of the supporting members to prevent the withdrawal of the reinforcing members therefrom, mounting the reduced ends of said members in contiguous relation about the axis of the wheel and bolting together the axle member and said larger ends.

13. In a vehicle wheel, the combination of an apertured rim, a hub, a series of radially-arranged tubular junction members having reduced and open ends and a relatively larger intermediate portion, the inner ends secured to the hub, and tubular metal spokes having means for attachment to said rim and having expanded inner ends positioned within said enlarged portion of the junction members and having means for securing said inner ends in said enlarged portion and spaced from said hub.

14. In a metal vehicle wheel, the combination of a rim, a hub, a series of tubular spokes connected with said rim, a series of metal, tubular supports enclosing the inner ends of said spokes and fixedly secured to said hub, and reinforcing members within said supports engaging said inner ends and serving to hold the latter in spaced relation to the hub.

15. In a metal vehicle wheel, the combination of a rim, a hub, a series of spokes connected with said rim, and a series of elongated supporting members for bracing said spokes at their inner ends and hold them elevated from the hub comprising, outer casings having frusto-conical ends enclosing the inner ends of said spokes and opposite frusto-pyramidal ends for engaging the hub, and inner reinforcing, hollow members having the general form of said outer casings, the outer ends of said reinforcing members being inserted in the spoke ends, thereby holding said spoke ends between metal walls of the outer and inner elements.

In testimony whereof I hereunto affix my signature.

ERNEST H. ARNOLD.